(12) United States Patent
Andre

(10) Patent No.: US 8,820,500 B2
(45) Date of Patent: Sep. 2, 2014

(54) AUXILIARY AND MOTIVE ELECTRIC POWER PICK-UP STRUCTURE FOR LAND VEHICLES

(75) Inventor: Jean-Luc Andre, Molsheim (FR)

(73) Assignee: Lohr Industrie, Hangenbieten (FR)

( * ) Notice: Subject to any disclaimer, the term of this patent is extended or adjusted under 35 U.S.C. 154(b) by 216 days.

(21) Appl. No.: 13/510,319

(22) PCT Filed: Nov. 23, 2010

(86) PCT No.: PCT/IB2010/055363
§ 371 (c)(1),
(2), (4) Date: Jun. 26, 2012

(87) PCT Pub. No.: WO2011/061723
PCT Pub. Date: May 26, 2011

(65) Prior Publication Data
US 2012/0261224 A1    Oct. 18, 2012

(30) Foreign Application Priority Data

Nov. 23, 2009  (FR) ...................................... 09 05622

(51) Int. Cl.
*B60L 5/42*    (2006.01)
(52) U.S. Cl.
CPC ............... *B60L 5/42* (2013.01); *B60L 2200/26* (2013.01)
USPC ............................... 191/47; 191/59.1; 191/50
(58) Field of Classification Search
CPC ......... B60L 2200/26; B60L 5/16; B60L 5/32; B60L 5/08; B60L 5/30; B60L 5/42; B60L 5/22; B60L 5/28
USPC ........... 191/49, 59, 50, 57, 58, 59.1, 60, 60.2, 191/60.3, 67, 68
See application file for complete search history.

(56) References Cited

U.S. PATENT DOCUMENTS

| | | | | |
|---|---|---|---|---|
| 801,226 | A | * | 10/1905 | Davis ............................... 191/56 |
| 1,125,518 | A | * | 1/1915 | Hampshire ..................... 191/65 |

FOREIGN PATENT DOCUMENTS

| | | |
|---|---|---|
| DE | 301031 | 1/1917 |
| FR | 2 118 802 | 7/1972 |
| GB | 318 666 | 9/1929 |
| GB | 318666 | * 9/1929 |
| GB | 320 253 | 10/1929 |

* cited by examiner

*Primary Examiner* — Mark Le
(74) *Attorney, Agent, or Firm* — Davis & Bujold, PLLC; Michael J. Bujold

(57) ABSTRACT

An auxiliary and motive electric power pick-up structure for articulated and non-articulated land vehicles, such as electric public transport vehicles, that pass close to a collector-shoe-type power supply member mounted on a stationary support (17) along the route of the vehicle and positioned at intervals along the length of the route in order to provide auxiliary and motive electric power to the vehicle by way of the shoe (16). The structure comprises at least one conductor rail mounted on insulating supports (11) attached to the vehicle by suspension points (34), each including an elastic suspension unit (30) and a pneumatic, hydraulic or other type active suspension unit (33). In the case of articulated vehicles, the pick-up structure is divided into power supply segments (14) separated by a conducting link (19) at each articulated unit of the vehicle.

27 Claims, 3 Drawing Sheets

AUXILIARY AND MOTIVE ELECTRIC POWER PICK-UP STRUCTURE FOR LAND VEHICLES

This application is a National Stage completion of PCT/IB2010/055363 filed Nov. 23, 2010, which claims priority from French patent application serial no. 09-05622 filed Nov. 23, 2009.

FIELD OF THE INVENTION

The present invention relates to a structure for collecting motive and auxiliary electrical energy for a transport vehicle.

More specifically, it relates to an overhead collection structure, called a roof structure, supported by a land transport vehicle, for example, a public urban transportation vehicle. This collection structure cooperates with electrical energy distribution arms, each mounted on a post or other support, the posts or supports being placed along the route of the vehicle.

BACKGROUND OF THE INVENTION

In order for the mechanical and electrical intake contact and the sliding electrical contact of a collection supply shoe on a linear collection structure to operate correctly, several conditions must exist.

First, the mechanical contact must occur smoothly and progressively. Next, the electrical contact must be established correctly and continue for the entire length of the collection structure.

To do this, a mechanical means must be provided to achieve and maintain nearly perfect mechanical contact between the two opposing surfaces. The quality of this contact necessitates precise geometry and a means for recovering any deviations and irregularities during the contact phase, that is, the electrical supply phase.

SUMMARY OF THE INVENTION

The goal of the present invention is to establish and maintain a quality contact between an electrical energy supply shoe and a collection structure carried on a land vehicle, for example, a public transportation vehicle formed of several modules articulated to one another.

For this purpose, the collection structure is affixed so that it is suspended elastically and pneumatically on a vehicle, preferably on its roof. Lateral application and application beneath the vehicle are also to be included within the present invention. The electrical energy collection structure of the invention can therefore be attached to the roof, to a lateral wall, to the lower wall or to the chassis of the vehicle.

The invention furnishes a motive and auxiliary electrical collection structure for a land vehicle, especially a public urban transport vehicle, articulated or non-articulated, passing close to a collector shoe type of electrical supply element mounted on a support attached along the length of the vehicle's travel route and duplicated at intervals along this route, for supplying motive and auxiliary electrical energy to the vehicle.

According to the invention, this collection structure comprises a conductor rail having one surface that is the surface upon which the electrical supply shoe slides. This collection structure is mounted on insulated supports attached to the vehicle by suspension points, each comprising an elastic suspension means and a controllable suspension means, for example, one that is active pneumatically, hydraulically, or in some other way.

More particularly, in the case of articulated vehicles, the electrically conductive and rigid collection structure may be formed of successive segments of conductor rails. These segments are elastically suspended on the roof of each module of an articulated transport vehicle, with the rail segments connected to one another at the level of the vehicle's articulation units using a flexible conductive connections, for example, connections formed of leaves in a transverse stack which can slide longitudinally along one another either individually or in groups and flex in order to absorb rolling, pitching and turning movements. The one or more end segments each form a tip or a ramp allowing the collector shoe to contact the rail progressively. Two tips or ramps exist in the case of bidirectional vehicles. In the case of mono-unit vehicles or vehicles formed of successive units, the collection structure is composed of only one or several rail segments.

A few of the many features of the invention are listed below:
- ideal electrical and mechanical contact conditions during electrical supply;
- excellent protection from electrical danger due to the ability to lower the collection structure, for example, during station stops;
- a permanent adaptation not subject to shocks, jolts, vibrations and other possible interference during travel;
- adaptation to rolling, pitching and turning while still maintaining continuous electricity supply;
- low noise level and acoustical filtration;
- ease of use;
- automatic adaption to curves along the route;
- modularity allowing it to be adapted to the vehicle's length or composition;
- flexibility for absorbing variations in height; and
- simplicity of installation on existing operational vehicles.

BRIEF DESCRIPTION OF THE DRAWINGS

Other characteristics and features of the invention will be apparent from the following description, provided by way of example and accompanied by drawings in which.

DETAILED DESCRIPTION OF THE PREFERRED EMBODIMENTS

Figure 1:
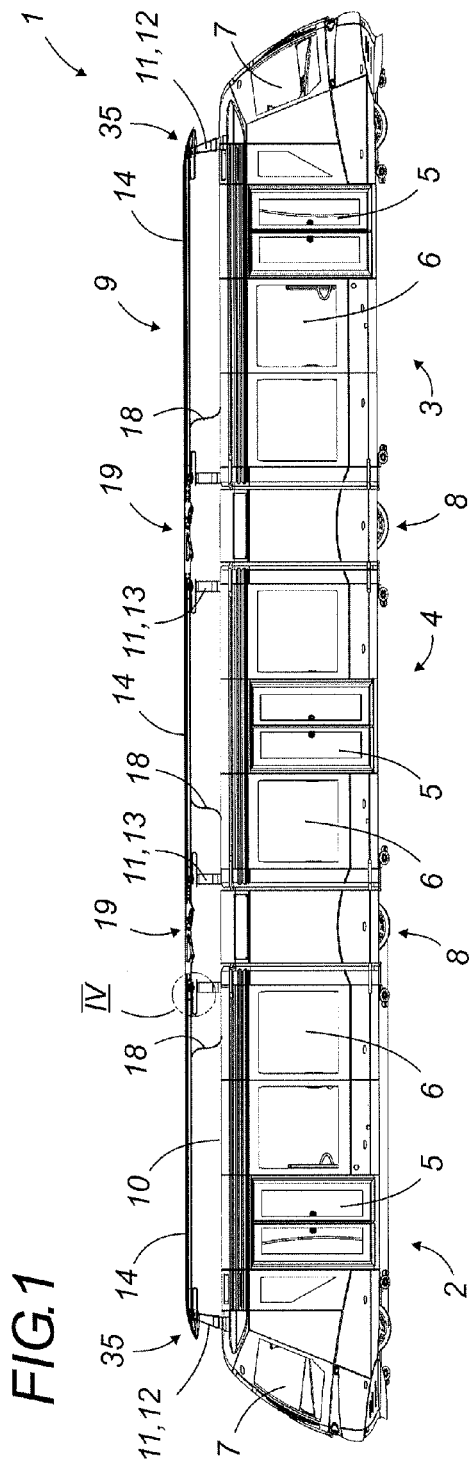
FIG. 1 is a profile view of a land vehicle formed of several modules articulated to one another and comprising a roof collection structure according to the invention in the lowered position.
Figure 2:
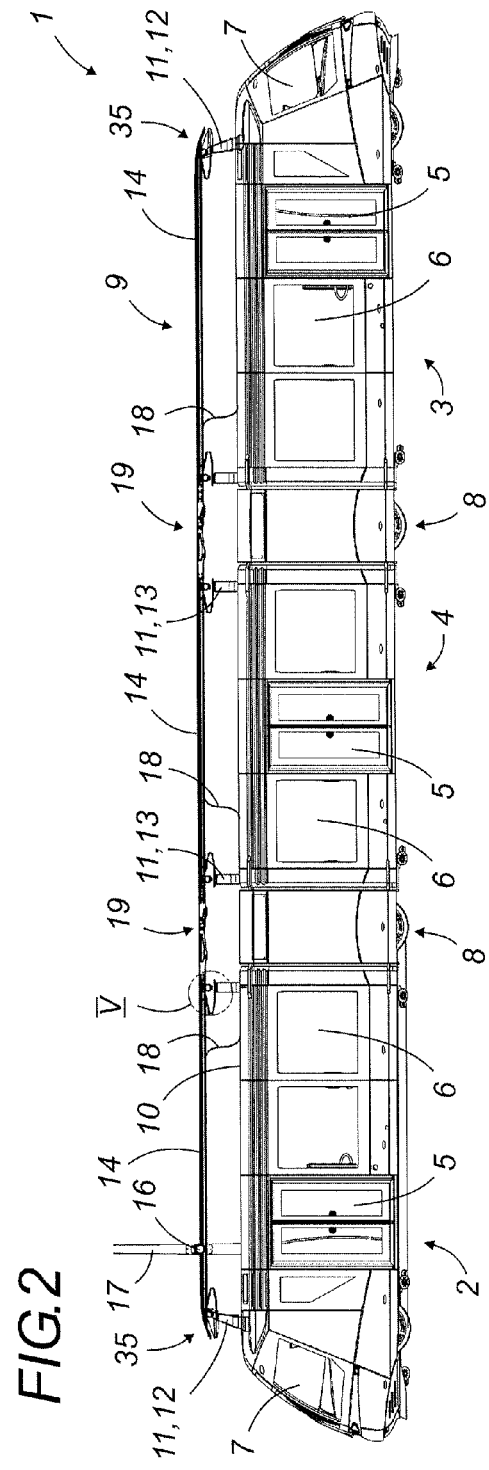
FIG. 2 is a profile view of a land vehicle formed of several modules articulated to one another and comprising a roof collection structure according to the invention in the raised position.

The motive and auxiliary electrical energy collection structure applies more particularly, but not exclusively, to a public urban road transport vehicle. It applies especially to vehicles of the type shown in FIGS. 1 and 2, that is, a public transport vehicle forming a convoy 1 consisting of a series of several modules, at least one front module 2 and one rear module 3, as well as one or more intermediate modules such as module 4, or non-articulated vehicles, or vehicles formed of a succession of units. Preferably they all comprise access doors such as door 5, windows such as window 6, as well as a driver's cab 7 for the front and rear end modules 2 and 3. The modules are articulated to one another in succession by articulation units 8 each supported by a guided or non-guided axle.

The passenger transport vehicle or convoy 1 comprises an upper motive and auxiliary energy collection device 9, preferably but not necessarily attached to its roof 10 using insulating supports such as supports 11.

In the preferred embodiment shown, slightly oblique end supports 12 and straight intermediate supports 13 can be distinguished. Insulating supports 11 are only present on modules 2, 3, 4 and not on articulation units 8. They are preferably placed at each of the extremities of each module 2, 3 and 4.

Collection structure 9 is, in the most general sense, a rigid or semi-rigid electrically conductive line that may assume various forms with respect to both transverse section and length. Thus, this line may be a wire or a cable, a rail, or any other adapted form. Additionally, it may progress longitudinally in a straight, rectilinear, undulating, zigzag or other undulating shape; it may change direction multiple times or have lateral variations such as separations or deviations on either side of a longitudinal axis.

Collection structure 9 is preferably formed of a succession of electrically conductive segments, for example, conductive rails such as rail 14 with a generally flat, smooth upper surface 15 capable of serving as a surface for a shoe or electrical supply shoe 16 to slide upon, held by a stationary support 17 such as a post or the like, a large number of which are positioned along the travel path and spaced apart from one another according to electricity supply requirements.

Numerous types of supports 17 exist which can be used with collection device 9 of the invention. For example, they may be posts, upright elements, signal panels, the lower or lateral surface of a bridge or a tunnel, a building façade, or a travelers' shelter, or any other fixed structure located near the vehicle's travel route.

These supports 17 each contain one or more fixed collector shoes 16 which form an electrical contact by sliding along upper surface 15 of collection structure 9 and are displaced relative to collector shoes 16 as the vehicle advances.

To supply the vehicle or the convoy 1 during travel, there must be a multitude of supports 17 along the travel route or in localized areas. The spacing between these supports depends on the motive or auxiliary electrical energy supply requirements. This spacing may be planned so that a collector shoe 16 is always in contact with collection structure 9 regardless of the position of vehicle 1 along its travel route.

Segments 14, for example rail segments, are electrically connected to the supply terminals on vehicle 1 by one or more flexible supply conductors such as conductor 18 present on the extremities of collection structure 9 or preferably, for greater safety, at the level of each module 2, 3, 4 in order to ensure continuous electricity supply to the vehicle even if the electrical continuity in collection structure 9 is interrupted.

Figure 3:
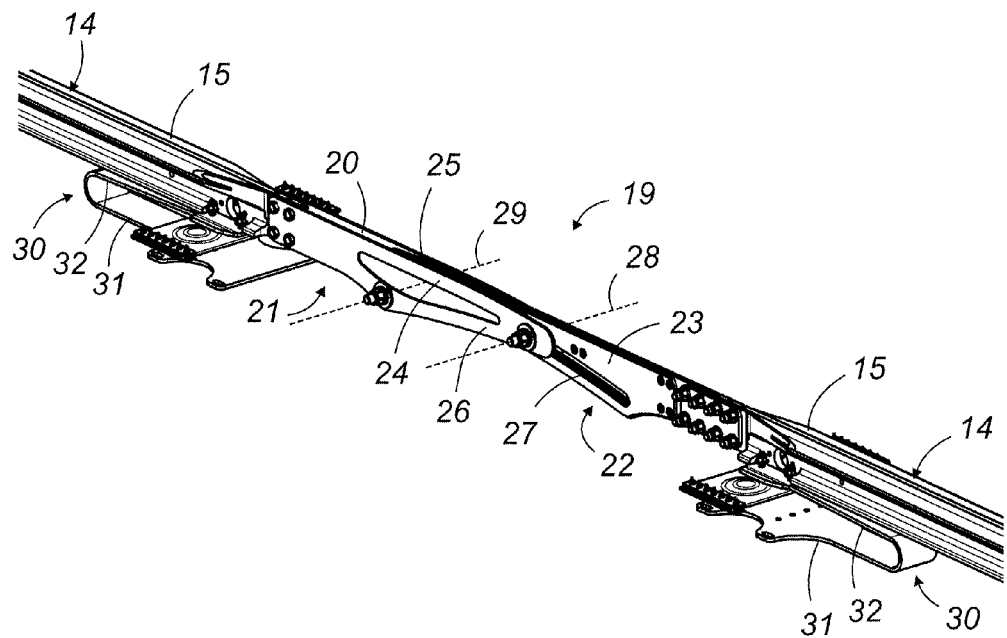
FIG. 3 is a perspective view of the inter-modular connection of a collection structure according to the invention.
Figure 4:
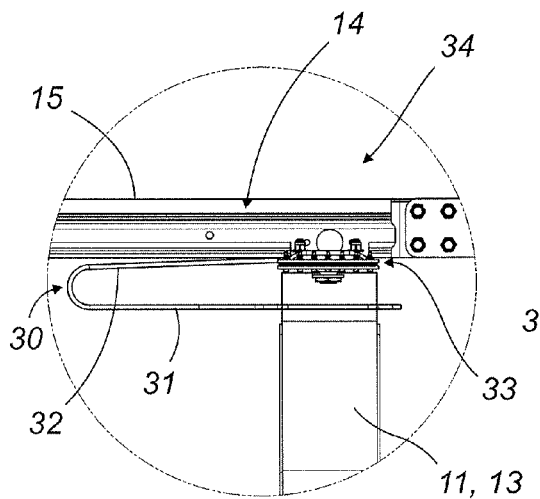
FIGS. 4 and 5 are enlarged views of details IV and V, respectively, circled in FIGS. 1 and 2.
Figure 5:
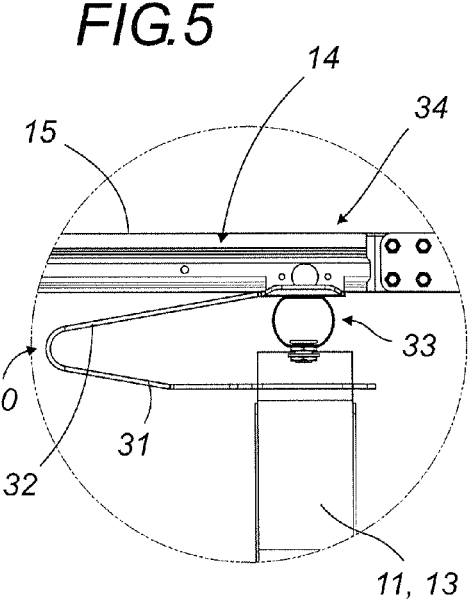
Figure 6:
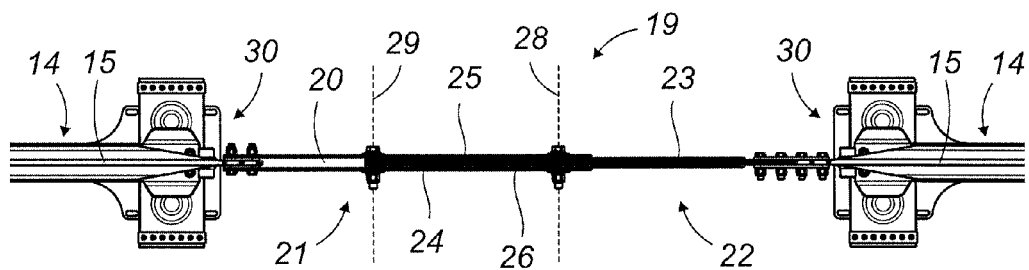
FIG. 6 is a plane schematic view of the inter-modular connection of FIG. 3.

Segments 14, for example rail segments, are interrupted at the level of each articulation unit 8 to be replaced by en electrically conductive connection, for example, a deformable type of connection such as connection 19, one constructive example of which is shown in FIG. 3.

In another embodiment provided by way of example, conductive connection 19 may be made of a sliding articulated structure designed to absorb motion of the units of the modules during travel. In another embodiment, segments 14 may be interrupted at the articulation level, with the successive segment either laterally covering the preceding segment or being interrupted again, especially if the vehicle is equipped with an energy reserve buffer.

Conductive connection 19 joins segments 14 to one another, for example rail segments, at the level of each articulation unit 8. This conductive connection 19 is flexible enough to ensure continuity of the electricity supply while still adapting to the various relative movements of successive modules of the vehicle or convoy 1 during travel. For this purpose, upper edge 20 of each conductive connection 19 constitutes the continuation of the path which electrical supply collector 16 slides upon, consisting of upper surface 15 of segments 14, for example rail segments, on the conductive line.

The purpose of the inter-modular flexible conductive connections 19 is to absorb as much as possible of the rolling, pitching and turning motion related to travel and to the topology of the travel surface, as well as the relative moving together and separating of successive vehicle modules related to vehicle acceleration, deceleration or braking and generally speaking, to vehicle dynamics.

As previously indicated deformable connection 19 absorbs all the rolling, pitching and turning motion while still ensuring continuity of the electrical supply.

FIGS. 3 and 6 through 8 show flexible conductive connection 19 which comprises two segments, 21 and 22, respectively, articulated to each other, each attached to the extremity of one of the segments 14, for example rail segments, located opposite them and connecting them to each other.

In the exemplary embodiment shown, flexible conductive connection 19 is formed of a plurality of leaves or groups of longitudinal leaves, for example a transverse stack, overlapping one another. At a minimum there exists a central leaf or central group 23 of leaves supported by one of the connection portions 19. Each of the sides and part of the length of portion 22 or central group 23 of leaves in the example shown is covered by two lateral leaves or two lateral groups of leaves 24 and 25, juxtaposed and supported by the second portion, here, portion 21 of connection 19 which has a fork shaped part 26. The assembly is connected with bolts and a longitudinal opening 27 serves as a groove allowing longitudinal play that absorbs slight variations in length and distance due to pitching and turning, as well the relative moving together and separation between successive vehicle modules.

According to the variation shown, the extremity of fork 26 pivots on a transverse axle 28 in longitudinal opening 27 that serves as a groove for it, while the extremity of the central leaf or the central bundle 23 of leaves is articulated to pivot on its extremity about transverse axle 29, using a bolt, for example. This brings latitude of movement allowing the different dynamic forces between two successive modules to be absorbed, particularly pitching and turning.

Furthermore, since the leaves are flexible, they also allow absorption of rolling motion through torsion deformation.

Segments 14, for example rail segments, are mounted on insulating end supports 12 or intermediate supports 13 using dual suspension.

Conversely, the dual suspension may be mounted on electrically insulated supports that are attached to the vehicle.

The first suspension is an elastic effect type suspension. It consists of a metal suspension leaf piece 30 of various conformations, for example, in the form of a pin or clamp, comprising a lower blade 31 and an upper blade 32 that are joined and derive from a metal plate or band bent to form a recumbent U-shaped piece 30. Lower blade 31 is attached to corresponding insulating support 11 and upper blade 32 to the extremity of segment 14.

To this same end segment 14, for example a rail segment, a suspension element is attached by one of its sides; it can be controlled actively, pneumatically or hydraulically or by another means 33, for example, an expandable flange or the end of an expandable pipe also attached by its opposite side to the extremity of corresponding insulating support 11. Active, pneumatic, hydraulic or other type of suspension element 33 may be any active, pneumatic, hydraulic or other type of suspension means; or an active, pneumatic, hydraulic or other type of component, for example, a bellows. It forms a flexible connection between the extremities of the two flanges 31 and 32 on the clamp shaped metal suspension piece 30, thereby constituting a suspension point 34.

There is a suspension point 34 at each extremity of each segment 14, for example, rail segment.

This constitutes a composite dual effect suspension: a flexible suspension using clamp shaped metal suspension piece 30 whose elasticity ensures slight stiffness of torsion and allows the collection structure to conform to the static and dynamic characteristics of the supply arm; and, the other, a pneumatic or hydraulic, and more generally an active suspension, i.e., one that can be controlled using pneumatic or hydraulic suspension element 33 which counteracts shaking, shocks and vibrations and provides effective acoustical filtration.

Because of the controllable active connection, it is possible to lower the collection structure into a safety position, that is, away from tension, and to then raise it into the electrical supply position. These movements are performed on command either manually, semi-automatically or entirely automatically.

An important advantage of the active, pneumatic, hydraulic or other type of suspension is that it provides a means to actively pass collection structure 9 from a lower position to an upper position and maintain it in one or the other position for the required time.

This is particularly useful during disconnection for safety reasons at station stops. Moreover, as this suspension stiffens only slightly during torsion, it automatically adapts to the presentation of sliding surface 15 on the conductive segment opposite the collector shoe of the supply arm to form a complete contact along the entire surface.

The suspension means at suspension points 34 used for raising or lowering the conductive segments may comprise purely a suspension function and they may be associated with specific raising and lowering means.

The energy collection structure of the invention has on at least one extremity a sloped, curved segment with a smooth surface, transverse plane, forming an angled engaging ramp 35 continuous with the extremity of each end rail segment. This angled engaging ramp 35 serves as an intake contact surface for the collector shoe or electrical supply shoe along which the collection structure is displaced. Its first portion may also serve as a driving surface to retract a pivoting protective cap and uncover the electric collection device. The shape of this angled engaging ramp 35 may vary. Its general function is to form the smoothest possible mechanical and electrical contact, taking it progressively and gently to sliding surface 15 of the collection structure.

This angled engaging ramp 35 is held by a special end support comprising a suspension reinforced with two metal clamps and a pneumatic, hydraulic or otherwise activated expandable element for improved shock absorption during electrical contact.

There is an angled engaging ramp 35 at the front and at the rear of the collection structure.

Of course it is possible to construct angled engaging ramp 35 differently, for example, an angled ramp separated from the end of the rail segment and adjacent to it. It is also possible for a variation to have two parallel ramps, which would serve only to retract the protective piece on the collection device.

Figure 7:
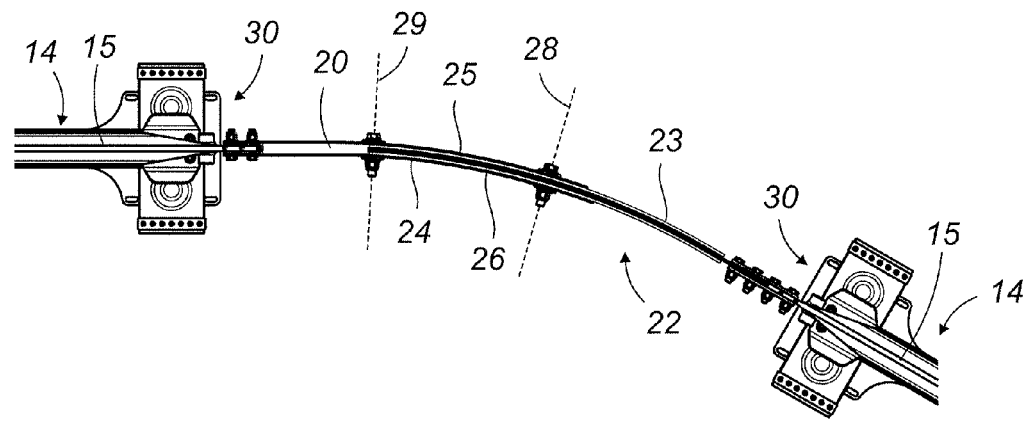
FIGS. 7 and 8 are schematic views showing the deformation of the inter-modular connection on curves and over depressions, respectively.
Figure 8:
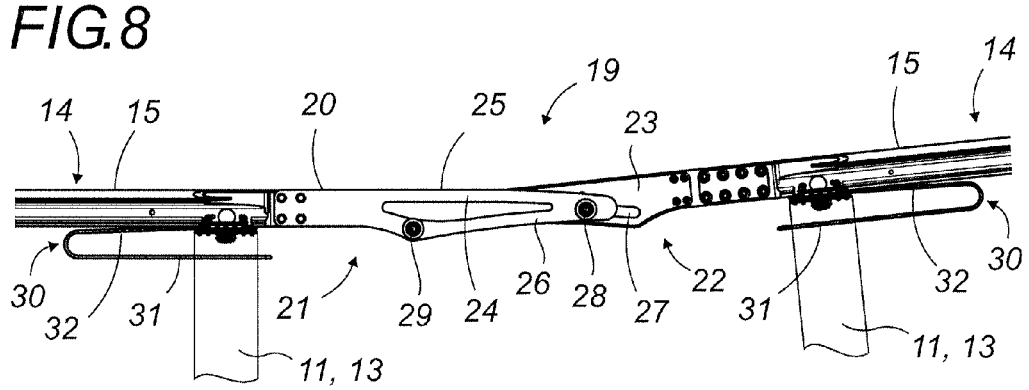

FIGS. 7 and 8 respectively show the deformation of the flexible articulated connection on a curve, for example, when turning left; and when passing over a recessed area.

FIG. 7 illustrates the curving deformation of the leaves and slight sliding to the level of the fork.

In FIG. 8 the transverse bolt axle is displaced into longitudinal opening 27 while the other transverse axle 29 remains fixed. This absorbs the slight moving together during passage over a recessed area.

The invention claimed is:

1. A structure for collecting motive and auxiliary electrical energy for a land vehicle that is either articulated or non-articulated and formed of at least one module which passes close to an electrical power supply shoe that is mounted on a stationary support along a route of the vehicle, a plurality of the stationary supports and the electrical power supply shoes are positioned along the route to supply the vehicle with motive and auxiliary electrical energy, the structure comprising:
at least one conductive line (14), an upper portion of which having a surface on which the electrical power supply shoe slides,
the structure being mounted on the vehicle using controllable suspension points (34) and electrically insulated supports,
the structure comprising, at at least one of its extremities, a ramp (35) for engaging with either the electrical power supply shoe or the stationary support,
two successive conductive segments are joined to one another by a deformable conductive connector (19),
the deformable connector (19) is a flexible conductive connector that absorbs rolling, pitching and twisting movement while still ensuring continuity of the motive and auxiliary electrical energy supply,
an upper edge (20) of each of the deformable conductive connectors (19) constitutes a continuation of the surface of the conductive line upon which the electrical power supply shoe slides.

2. The structure for collecting electrical energy according to claim 1, wherein the suspension points (34) are mounted on the electrically insulated supports (11) affixed to the vehicle.

3. The structure for collecting electrical energy according to claim 1, wherein the conductive line is a conductive rail (14).

4. The structure for collecting electrical energy according to claim 1, wherein the conductive line (14) is rectilinear.

5. The structure for collecting electrical energy according to claim 4, wherein the engaging ramp (35) is present at each extremity of the at least one rectilinear conductive line (14) on the structure for collecting electrical enemy.

6. The structure for collecting electrical energy according to claim 1, wherein the conductive line is formed from several of the conductive segments (14).

7. The structure for collecting electrical energy according to claim 6, wherein adjacent ends of the two successive conductive segments (14) are coupled to one another by the deformable connector.

8. The structure for collecting electrical energy according to claim 1, wherein the conductive line (14) is either raised or lowered, either in its entirety or in sections.

9. The structure for collecting electrical energy according to claim 8, wherein the controllable suspension points (34) are controllable to either raise or lower the conductive line (14) at least locally or the controllable suspension joints are associated with an active suspension which either raises or lowers the conductive line.

10. The structure for collecting electrical energy according to claim 9, wherein the suspension points (34) comprise at least one flexible suspension element and one other suspension element that is activated either pneumatically or hydraulically, each being connected to one of the electrically insulated supports (11).

11. The structure for collecting electrical energy according to claim 10, wherein the flexible suspension element comprises a flexible leaf affixed to the electrically insulated support (11) and supporting either the conductive line or a segment of the conductive line (14).

12. The structure for collecting electrical energy according to claim 11, wherein the flexible leaf is a metal clamp (30) which comprises an upper blade (31), affixed to the conductive line (14), and a lower blade (32), affixed to the electrically insulated support (11).

13. The structure for collecting electrical energy according to claim 12, wherein the metal clamp (30) has a recumbent U shape.

14. The structure for collecting electrical energy according to claim 10, wherein the other suspension element is activated either pneumatically or hydraulically and is an expandable element that loins the conductive line (14) to the electrically insulated support (11).

15. The structure for collecting electrical energy according to claim 14, wherein the expandable element is either pneumatically or hydraulically activated and is either a flange, an end of an expandable pipe, or a bellows that is controlled either pneumatically, or hydraulically.

16. The structure for collecting electrical energy according to claim 1, wherein the controllable suspension points (34) comprise one or more suspension elements for filtering shocks, electrical contact noise and electrical collection noise.

17. The structure for collecting electrical energy according to claim 1, wherein the deformable connector (19) is an articulated conductive connection.

18. The structure for collecting electrical energy according to claim 1, wherein the flexible conductive connector (19) comprises a plurality of leaves.

19. The structure for collecting electrical energy according to claim 1, wherein the structure is affixed to one of a roof, a lateral wall, and a lower wall of the vehicle.

20. The structure for collecting electrical energy according to claim 1, wherein the engaging ramp (35) is an angled extension of the at least one conductive line (14).

21. The structure for collecting electrical energy according to claim 1, wherein the engaging ramp (35) is present at each extremity of the structure for collecting electrical energy.

22. The structure for collecting electrical energy according to claim 1, wherein the structure comprises two engaging ramps (35).

23. A structure for collecting motive and auxiliary electrical energy for a land vehicle that is either articulated or non-articulated and formed of at least one module which passes close to an electrical power supply shoe that is mounted on a stationary support along a route of the vehicle, the route comprises a plurality of the electrical power supply shoes and stationary supports to supply the vehicle with motive and auxiliary electrical energy, the structure comprising:
- at least one conductive line (14), an upper portion of which having a surface on which the electrical power supply shoe slides,
- the structure being mounted on the vehicle using controllable suspension points (34) and electrically insulated supports,
- the structure comprising, at at least one of its extremities, a ramp for engaging with the electrical power supply shoe or the stationary support,
- two successive conductive segments are joined to one another by a deformable connector (19),
- the deformable connector (19) is a flexible conductive connector that absorbs rolling, pitching and twisting movement while still ensuring continuity of the motive and auxiliary electrical energy supply,
- the flexible conductive connection (19) comprises a plurality of leaves, and
- the leaves form several longitudinal groups of leaves stacked transversely.

24. The structure for collecting electrical energy according to claim 23, wherein the either leaves or the groups of leaves overlap one another.

25. The structure for collecting electrical energy according to claim 23, wherein either two leaves or two lateral groups (24, 25) of leaves are parallel and form a fork (26) which receives either a central leaf or a central group (23) of leaves, an extremity of the central leaf or the central group (23) of leaves is attached to pivot on a transverse axle (29) between the two parallel leaves or the two lateral groups of leaves to constitute a continuation of the flexible connection (19).

26. The structure for collecting electrical energy according to claim 25, wherein an extremity of the fork (26) is attached to pivot by a transverse axle (28) in a longitudinal opening (27) that forms a groove for the transverse axle.

27. An electrical energy collection structure for a land vehicle for receiving electrical energy from a series of electric power supply shoes that are supported by respective stationary supports that are spaced from each other at intervals along a route, the land vehicle being formed by a plurality of connected vehicle modules that are either articulated or non-articulated with respect to each other, the electrical energy collection structure comprising:
- a plurality elongate conductive segments, each of the elongate conductive segments is respectively fixed, via controllable suspension points and electrically insulated supports, to the vehicle modules such that the elongate conductive segments are substantially aligned along the land vehicle, each of the elongate conductive segments comprises an upper surface upon which an electrical power supply shoe contacts and slides as the land vehicle passes the corresponding stationary support;
- the elongate conductive segment of at least a leading vehicle module of the land vehicle has an angled ramp which facilitates sliding contact between the upper surfaces of the elongate conductive segments and the electrical power supply shoe; and
- the elongate conductive segments of successive vehicle modules are coupled to one another by a flexible conductive connector that absorbs rolling, pitching and twisting movement of the connected elongate conductive segments with respect to each other, the conductive connector comprises an upper surface having opposed ends, and the conductive connector couples the elongate conductive segments of successive vehicle modules such that the upper surface of the conductive connector at the opposed ends thereof are flush to the respective upper surfaces of the elongate conductive segments of the successive vehicle modules and form a continuous contact surface along the plurality elongate conductive segments on which the electrical power supply shoe contacts and slides.

\* \* \* \* \*